(12) United States Patent
Suzuki

(10) Patent No.: US 7,677,517 B2
(45) Date of Patent: Mar. 16, 2010

(54) SWIVEL STAND

(75) Inventor: Hisaya Suzuki, Fujieda (JP)

(73) Assignee: Murakami Corporation, Shizuoka (JP)

( * ) Notice: Subject to any disclaimer, the term of this patent is extended or adjusted under 35 U.S.C. 154(b) by 520 days.

(21) Appl. No.: 10/570,241

(22) PCT Filed: Aug. 25, 2004

(86) PCT No.: PCT/JP2004/012595

§ 371 (c)(1),
(2), (4) Date: Jul. 5, 2006

(87) PCT Pub. No.: WO2005/022024

PCT Pub. Date: Mar. 10, 2005

(65) Prior Publication Data

US 2007/0007401 A1 Jan. 11, 2007
US 2008/0185484 A9 Aug. 7, 2008

(30) Foreign Application Priority Data

Aug. 29, 2003 (JP) ............................ 2003-209817

(51) Int. Cl.
*F16M 13/00* (2006.01)
(52) U.S. Cl. .................... 248/349.1; 248/917; 248/922
(58) Field of Classification Search ............. 248/125.9, 248/349.1, 125.7, 917–924; 361/681–683
See application file for complete search history.

(56) References Cited

U.S. PATENT DOCUMENTS

| | | | | |
|---|---|---|---|---|
| 4,796,842 A | | 1/1989 | Hamada et al. | |
| 4,905,543 A | * | 3/1990 | Choi | 74/827 |
| 5,715,138 A | * | 2/1998 | Choi | 361/681 |
| 5,749,556 A | * | 5/1998 | Matsuoka et al. | 248/349.1 |
| 6,007,038 A | * | 12/1999 | Han | 248/371 |
| 6,024,335 A | * | 2/2000 | Min | 248/371 |
| 6,124,892 A | | 9/2000 | Nakano | |
| 6,231,020 B1 | * | 5/2001 | Willson | 248/349.1 |
| 6,481,686 B1 | * | 11/2002 | Jan | 248/349.1 |
| 6,789,976 B2 | * | 9/2004 | Hung et al. | 403/84 |

FOREIGN PATENT DOCUMENTS

JP 57-178765 11/1982

(Continued)

OTHER PUBLICATIONS

Microfilm of the specification and drawings annexed to the request of Japanese Utility Model Application No. 065337/1981 (Laid-open No. 178765/1982), Nov. 12, 1982, Sony Corporation.
EP, Supplementary EP Search Report, Aug. 21, 2006.

*Primary Examiner*—Amy J Sterling
*Assistant Examiner*—Steven M Marsh
(74) *Attorney, Agent, or Firm*—Ditthavong Mori & Steiner, P.C.

(57) ABSTRACT

A swivel stand of the present invention has a mechanism by which while equipment 1 such as a TV monitor or monitor camera is rotated manually, the rotation of the equipment 1 (TV monitor 1) is controlled such that a disc 4 fixed by a worm gear 8 slides on a pole 2 joined to the equipment, or by which while the equipment 1 is rotated by the motor 9, the rotation of the equipment 1 is controlled such that the disc 4 rotated by the worm gear 8 synchronizes the pole 2 joined to the equipment 1.

8 Claims, 3 Drawing Sheets

FOREIGN PATENT DOCUMENTS

| | | |
|---|---|---|
| JP | 64-073876 | 3/1989 |
| JP | 07-203335 | 8/1995 |
| JP | 7-203335 | 8/1995 |
| JP | 09-018748 | 1/1997 |
| JP | 09-032992 | 2/1997 |
| JP | 9-32992 | 2/1997 |

\* cited by examiner

| | | | |
|---|---|---|---|
| 1: | TV MONITOR | 6: | THRUST BEARING |
| 2: | POLE | 7: | BASE |
| 3: | BUSH | 8: | WORM GEAR |
| 4: | DISC | 9: | MOTOR |
| 5: | GEAR | 10: | CONTROLLER |

SWIVEL STAND

TECHNICAL FIELD

The present invention relates to a swivel stand which turns equipment, such as a TV monitor or monitor camera, electrically or manually.

BACKGROUND ART

Known is a swivel stand in which a display or monitor camera to be turned is supported by an electric motor in a rotatable fashion (see Japanese Unexamined Patent Application Publications H9-18748, H7-203335 and H1-73876).

For example, according to the disclosure of JP H7-203335, a cabinet provided with a TV monitor is supported by a stand in a rotatable fashion. Furthermore, the rotational driving power generated by the rotation axis of an electric motor is transmitted to a base through both a gear and a gear unit composed of a worm wheel mating with the gear and large and small gears. Therefore, the forward/reverse rotation of the electric motor allows a cabinet to be turned clockwise or counterclockwise.

DISCLOSURE OF INVENTION

The above swivel stand of the background art is configured to be rotated electrically, and cannot be rotated manually.

However, in actual use of the above swivel stand, there are sometimes occasions when a remote controller by which a TV monitor faces in any directions is missing or when a viewer wants a nearby person to change the orientation of the TV monitor manually.

In this case, the above swivel stand of the background art cannot deal with the occasions, or either a complex clutch mechanism or controller is necessary, thus leading to the increase in the weight. In addition, the number of the components is made greater, thereby increasing costs or deteriorating the reliability.

The present invention has been conceived in consideration of the above description. An object of the present invention is to provide a simple swivel stand in which an electric or manual rotation can be used arbitrarily.

The present invention for overcoming the above disadvantage is directed to a swivel stand, and this swivel stand is characterized by including:

a base;

a disc being supported by the base in a rotatable fashion;

a gear being provided on a circumference of the disc; and a worm gear mating with the gear, the worm gear to be rotated by an electric motor, wherein while the equipment is rotated manually, the disc fixed by the worm gear slides on the support member supporting the equipment, so that a rotation of the equipment is controlled, and wherein while the equipment is rotated by the electric motor, the disc rotated by the worm gear synchronizes the support member, so that a rotation of the equipment is controlled.

In the present invention, the swivel stand is provided with a mechanism by which while the equipment such as a TV monitor or monitor camera is rotated manually, the rotation of the equipment is controlled such that the disc fixed by the worm gear slides on the pole joined to the equipment, or by which while the equipment is rotated by the motor, the rotation of the equipment is controlled such that the disc rotated by the worm gear synchronizes the pole joined to the rotatable equipment. Consequently, it is possible for the swivel stand to use an electric and manual drives in combination by employing the simple structure. In addition, since the number of the components is made small, the reliability is improved. The gear may be fitted into or mate with a circumference of the disc.

Furthermore, the present invention is characterized in that the disc and the gear are integrally molded. In the present invention, it is possible to switch the electric and manual operational states through the disc and the gear that are integrally molded. As a result, the electric and manual drive can be used in combination by employing the simple structure.

Moreover, the present invention is characterized in that the support member is a pole joined to the equipment, and a bush is secured to the pole, thereby decreasing the sliding resistance between the equipment and the disc upon manual rotation of the equipment.

In the present invention, since the bush is fixed to the pole to thereby decrease the sliding resistance between the equipment and the disc, the equipment can be rotated smoothly upon manual rotation of the equipment. This makes it possible to improve the usability.

The present invention is characterized in that the disc has a hollow, doughnut shape, the gear is provided on an inner circumference of the disc, and the electric motor and the worm gear are arranged within a hollow portion of the disc. In the present invention, the individual components of the swivel stand can be arranged space-efficiently.

Furthermore, the present invention is characterized in that at least one reduction gear is placed between the gear and the worm gear, and the reduction gear mates with them.

In the present invention, it is possible to adjust the torque or rotational speed of the electric motor by varying the size or the number of the reduction gear.

MODE(S) FOR CARRYING OUT THE INVENTION

Figure 1:
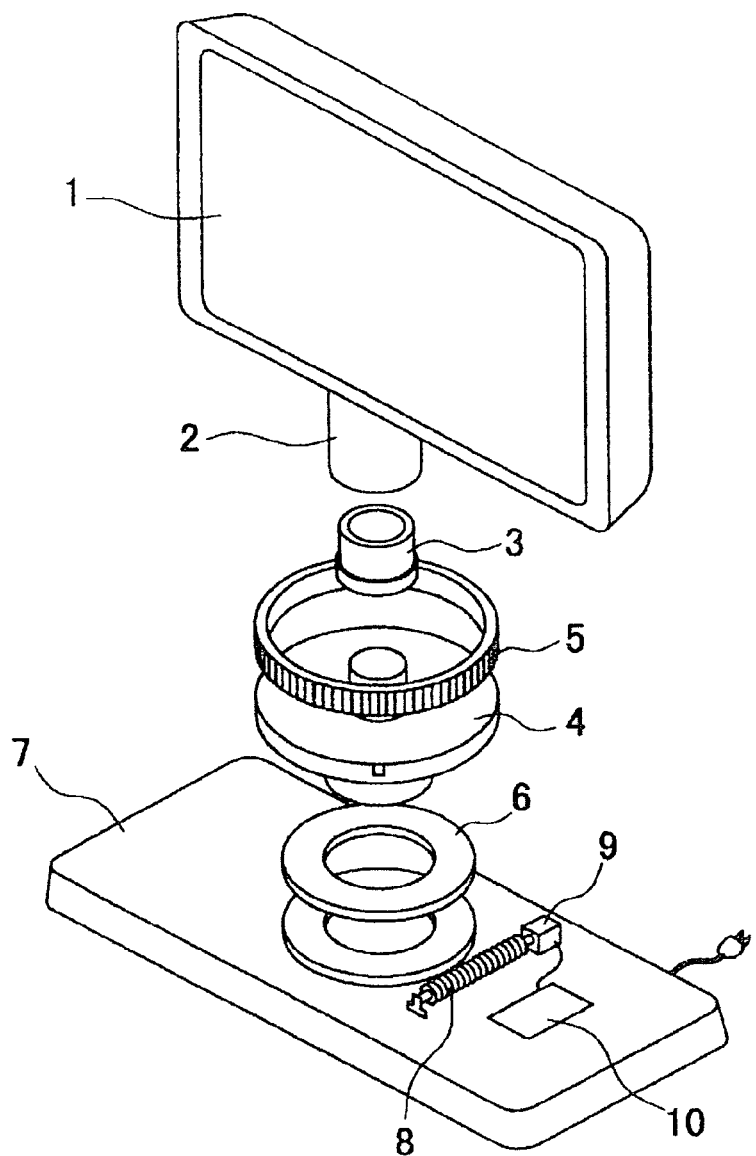
FIG. 1 is an exploded configuration view for explaining a swivel stand according to a first embodiment of the present invention.

FIG. 1 is an exploded configuration view for explaining a swivel stand according to a first embodiment of the present invention.

In FIG. 1, reference numerals 1, 2, 3, 4, 5, 6, 7, 8, 9 and 10 denote a TV monitor, pole, bush, disc, gear, thrust bearing, base, worm gear, motor and controller, respectively.

In the embodiments according to the present invention, the TV monitor 1 such as a plasma display or liquid crystal display, which is installed as equipment, is supported in such a way to rotate around the pole 2 joined to a housing and with respect to the base 7. The pole 2 is one example of a support member for supporting the equipment.

The bush 3 is fixed to the pole 2 and is used to decrease the sliding resistance to the disc 4 upon manual rotation.

The disc 4 is mounted on the base 7 in a rotatable fashion. This disc employs two-piece-structure, because the gear 5 is attached to the circumference of the disc 4. Alternatively, the disc 4 and the gear 5 may be integrated, but if they have the two-piece-structure, then both the strength necessary for the disc 4 and the productivity of the gear 5 can be attained.

The disc 4 is formed by resin integrated molding, casting or multi-peace press. Since the disc 4 is used to block power generated in the reverse direction, an appropriate fabrication is selected based on required conditions such as its overall cost, weight or strength. The gear 5 is formed from resin molding.

The worm gear 8, which is coupled directly to the motor 9 mounted on the base 7, mates with the gear 5, and is rotated by the motor 9.

In this embodiment, there are no gears between the gear 5 and the worm gear 8. In other words, a single stage reduction gear is employed. However, multiple gears may be arranged between the gear 5 and the worm gear 8. Specifically, a gear unit may be employed. In this case, the torque of the motor 9 and the rotational speed of the TV monitor 1 are adjustable. As a result, a significant effect can be produced although the number of the components increases.

Between the disc 4 and the base 7, the thrust bearing 6 made of resin or metal is provided, and it is configured to be supported by the pole 2.

Now, a description will be given, of a mechanism by which the TV monitor 1 is turned in combination with electric and manual operations.

While the TV monitor 1 is turned manually, the disc 4 fixed by the worm gear 8 slides on the pole 2 joined to the TV monitor 1, so that the rotation is controlled. In addition, while the TV monitor 1 is turned by the motor 9, the disc 4 rotated by the worm gear 8 and the pole 2 joined to the TV monitor 1 rotate in synchronization with each other, so that the rotation is controlled.

In this way, the operation of the motor 9 and the manual operation can be used separately, thus achieving the combination of electric and manual rotations.

It is assumed that while the TV monitor 1 is turned by the motor 9, the TV monitor 1 is caught by something or the rotation is hindered by a hand, in other words, the rotation of the TV monitor 1 is forced to stop. In this case, a slip motion is generated between the disc 4 and the base 7 similar to the behavior of the manual rotation, thereby preventing the motor from being damaged. Moreover, by installing a sensor on the base 7, the movement of the TV monitor 1 may be controlled by the controller 10. This enables the TV monitor 1 to return to a front or initial position from any given position instantly. The equipment to be rotated is not limited to the TV monitor 1. Alternatively, it may be a monitor camera. Thus, the swivel stand can function as one used for various equipment that will be rotated.

Figure 2:
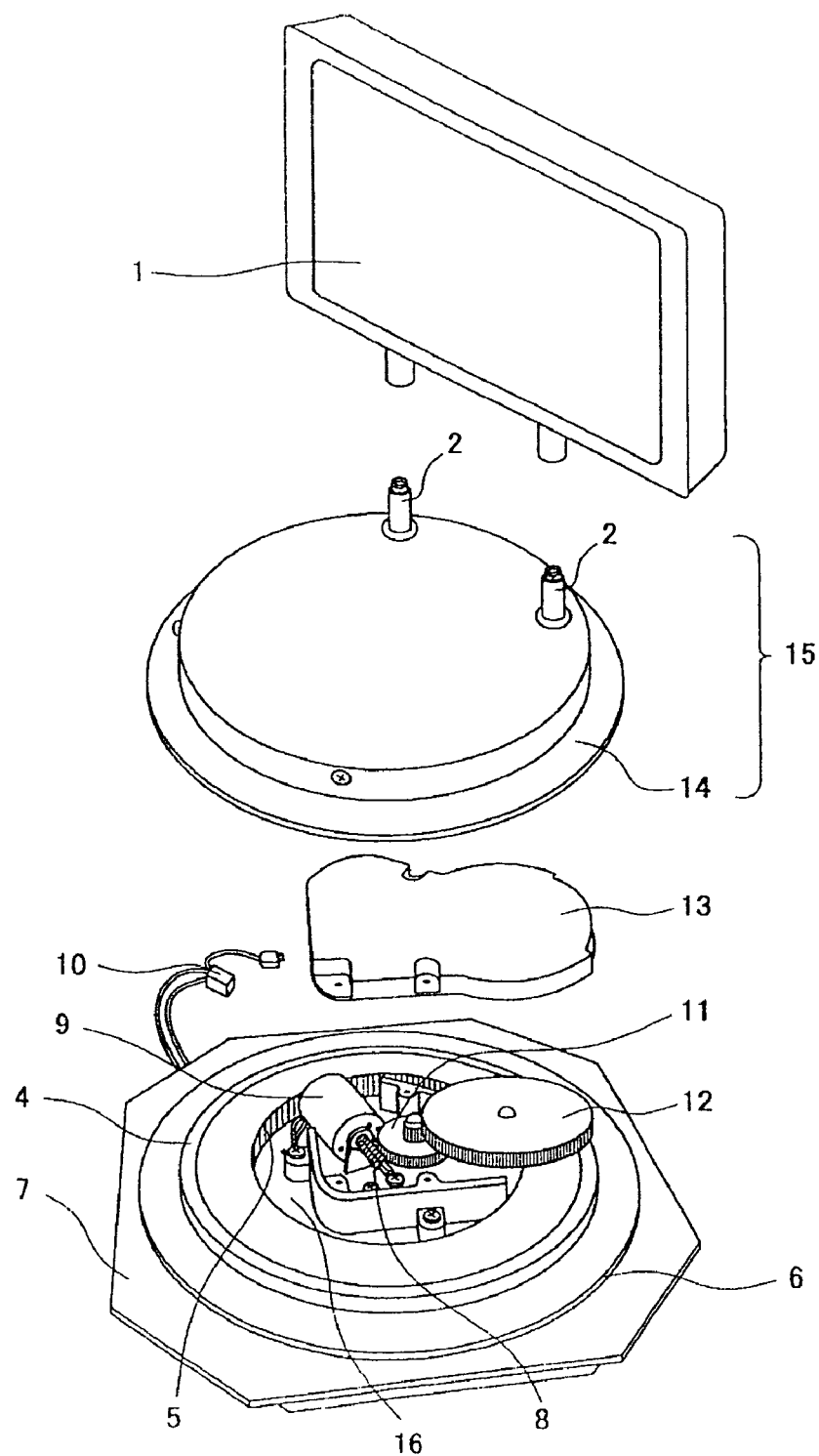
FIG. 2 is an exploded configuration view for explaining a swivel stand according to a second embodiment of the present invention.

FIG. 2 is an exploded configuration view for explaining a swivel stand according to a second embodiment of the present invention. In FIG. 2, except for components in the following description, the same reference numerals are given to the same parts shown in FIG. 1, and duplicate description therefore is omitted.

In FIG. 2, reference numerals 1, 2 and 4 denote a TV monitor, poles and disc, respectively. Reference numerals 5, 11 and 12 denote individual gears, respectively. Reference numerals 6, 7, 8, 9, 10, 13, 14 and 15 denote a thrust bearing, base, worm gear, motor, controller, middle cap, outer cap and support member, respectively.

In this embodiment, the support member 15 is composed of the poles 2 and the outer cap 14. While the TV monitor 1 is turned manually, the disc 4 fixed to the worm gear 8 slides on the support member 15, so that the rotation is controlled. In addition, while the TV monitor 1 is rotated by the motor 9, the disc 4 rotated by the worm gear 8 synchronizes the support member 15, so that the rotation is controlled. In this way, in this embodiment, the electric and manual rotations of the equipment, which is an object to be rotated, can be used in combination. These rotations are switched as necessary, thereby improving the usability.

The disc 4 is a doughnut-shaped disc having a hole in its center, and the gear 5 is provided in the inner circumference of the disc 4. The motor 9 and the worm gear 8 are provided in a hollow portion 16 of the disc 4. The hollow portion 16 is a hollow space at the center of the disc 4.

The gears 11 and 12 are arranged between the gear 5 and the worm gear 8. These gears 11 and 12 receive power of the motor 9 through the worm gear 8 and transmit it to the gear 5. With this configuration, the motor 9 and the worm gear 8 can be arranged space-efficiently.

The middle cap 13 is a cover to wrap the motor 8, the worm gear 9 and the gears 11 and 12 from above. The middle cap 13 supports, for example, the rotation axis of the gears 11 and 12 from above in a rotatable fashion. Moreover, the outer cap 14 has substantially the same diameter as that of the disc 4, and it covers the whole of the disc 4 from above. With this configuration, the motor 9, the worm gear 8 and the like that are provided within the hollow portion of the disc 4 can be protected favorably. Furthermore, since the diameter of the support member 15 including the outer cap 14 is large, the TV monitor 1 can be supported with stability.

Figure 3:
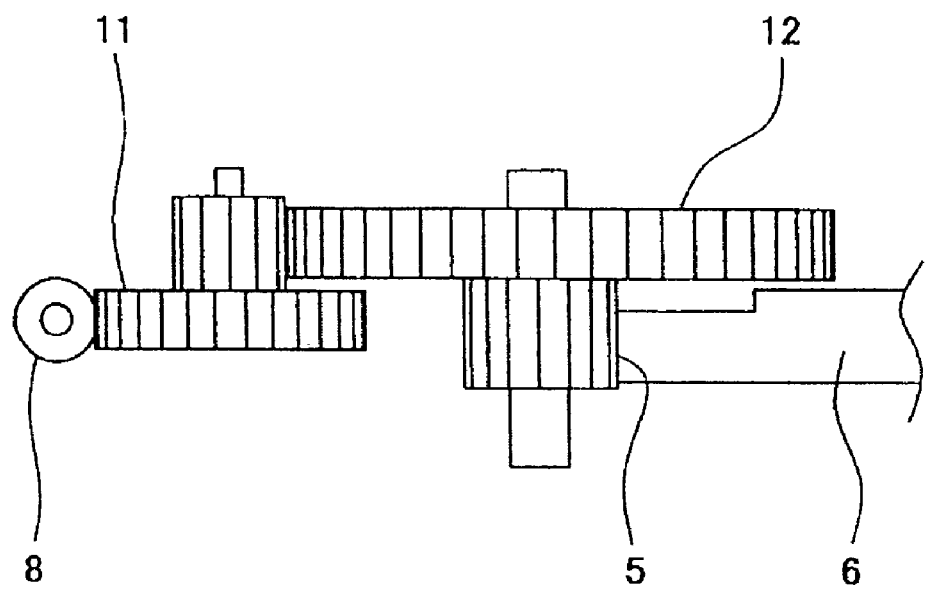
FIG. 3 is a view depicting a mating state of a worm gear 8 and gears 5, 11 and 12.

FIG. 3 is a view depicting a mating state of a worm gear 8 and gears 5, 11 and 12.

In the embodiments, the gears 11 and 12 serve as reduction gears, and each of them includes two, large and small pinions. The large pinion of the gear 11 mates with the worm gear 8, and rotates in conjunction with the worm gear 8. In addition, the small pinion of the gear 11 rotates in synchronization with the large pinion.

The large pinion of the gear 12 mates with the small pinion of the gear 11, and rotates in conjunction with the small pinion of the gear 11. Furthermore, the small pinion of the gear 12 mates with the gear 5, and rotates in conjunction with the large pinion to thereby transmit power to the gear 5. With this configuration, the power generated by the motor 9 (see FIG. 2) is delivered to the gear 5 appropriately, and the disc 6 provided with the gear 5 thus rotates correctly.

As described above, according to the present invention, equipment, which is an object to be rotated, can be rotated in combination of electric and manual operations. Accordingly, the operation is switched as necessary, so that the operationality is enhanced. Moreover, the present invention can be realized with a simple structure and a small number of components. This contributes to the reduction in weight and cost. Even if the breakage occur, it is easy to determine its cause, thus leading to the improvement of the reliability.

Furthermore, by applying the two-piece-structure to the disc and the gear, both the strength necessary for the disc and the productivity of the gear can be satisfied.

INDUSTRIAL APPLICABILITY

The present invention is applicable to a swivel stand appropriately which turns equipment, such as a TV monitor or monitor camera, electrically or manually.

The invention claimed is:

1. A swivel stand for turning equipment, comprising:
   a base;
   a disc being rotatably supported on the base and having a doughnut shape with a circular hollow portion in a center thereof;

a gear being provided on an inner circumference of the circular hollow portion of the disc;

an electric motor mounted on the base in the circular hollow portion of the disc;

a worm gear provided in the circular hollow portion and configured to be rotated by the motor, the worm gear mating with the gear via at least one reduction gear; and a support member covering over the disc and being configured to mount to the equipment, wherein an outer circumference of the support member is slidable on the disc, wherein the equipment is turned manually, the outer circumference of the support member slides on the disc and rotates, whereas the disc is fixed by mating with the worm gear, and wherein the equipment is rotated by the electric motor, the support member rotates in synchronization with the disc rotated by the worm gear.

2. The swivel stand according to claim 1, wherein the disc and the gear are integrally molded.

3. The swivel stand according to claim 1, wherein the support member is a pole being joined to the equipment, and wherein a bush is fixed to the pole to thereby decrease a sliding resistance between the equipment and the disc, which is generated upon the manual rotation of the equipment.

4. The swivel stand according to claim 2, wherein the support member is a pole being joined to the equipment, and wherein a bush is fixed to the pole to thereby decrease a sliding resistance between the equipment and the disc, which is generated upon the manual rotation of the equipment.

5. A swivel stand for turning equipment, said swivel stand comprising:

a base;

a disc rotatably supported by said base;

a support member rotatably supported by said disc, said support member being configured to support the equipment;

a gear mounted to said disc;

a worm gear mounted to said base, wherein said worm gear is directly mated to said gear or is indirectly mated to said gear via one or more reduction gears;

a motor configured to rotate said worm gear, wherein said swivel stand is configured to allow relative rotation between said support member and said disc when said worm gear is directly or indirectly mated to said gear, and wherein:

said disc has a hollow, doughnut shape;

said gear is provided on an inner circumference of the disc; and said motor and said worm gear are arranged within a hollow portion of said disc.

6. A swivel stand for turning equipment, said swivel stand comprising:

a base;

a disc rotatably supported by said base;

a support member rotatably supported by said disc, said support member being configured to support the equipment;

a gear mounted to said disc;

a worm gear mounted to said base, wherein said worm gear is directly mated to said gear or is indirectly mated to said gear via one or more reduction gears;

a motor configured to rotate said worm gear, wherein said swivel stand is configured to allow relative rotation between said support member and said disc when said worm gear is directly or indirectly mated to said gear, further comprising a thrust bearing provided in between said disc and said base.

7. A swivel stand for turning equipment, said swivel stand comprising:

a base;

a disc rotatably supported by said base;

a support member rotatably supported by said disc, said support member being configured to support the equipment;

a gear mounted to said disc;

a worm gear mounted to said base, wherein said worm gear is directly mated to said gear or is indirectly mated to said gear via one or more reduction gears;

a motor configured to rotate said worm gear, wherein said swivel stand is configured to allow relative rotation between said support member and said disc when said worm gear is directly or indirectly mated to said gear, further comprising a bush fixed to said support member and configured to decrease sliding resistance between said support member and said disc.

8. The swivel stand according to claim 6, further comprising a bush fixed to said support member and configured to decrease sliding resistance between said support member and said disc.

* * * * *